United States Patent
Ogata et al.

(10) Patent No.: US 10,147,241 B2
(45) Date of Patent: Dec. 4, 2018

(54) FITTING SUPPORT DEVICE AND METHOD

(71) Applicant: SEIREN CO., LTD., Fukui-shi, Fukui (JP)

(72) Inventors: Norihiro Ogata, Fukui (JP); Kozo Nagata, Fukui (JP); Junichi Hashimoto, Fukui (JP); Toshiro Kawabata, Fukui (JP)

(73) Assignee: SEIREN CO., LTD., Fukui-shi (JP)

( * ) Notice: Subject to any disclaimer, the term of this patent is extended or adjusted under 35 U.S.C. 154(b) by 0 days.

(21) Appl. No.: 15/029,339

(22) PCT Filed: Sep. 29, 2014

(86) PCT No.: PCT/JP2014/075786
§ 371 (c)(1),
(2) Date: Apr. 14, 2016

(87) PCT Pub. No.: WO2015/056552
PCT Pub. Date: Apr. 23, 2015

(65) Prior Publication Data
US 2016/0240002 A1 Aug. 18, 2016

(30) Foreign Application Priority Data
Oct. 17, 2013 (JP) .................................. 2013-216301

(51) Int. Cl.
*G06T 19/20* (2011.01)
*G06T 7/90* (2017.01)
(Continued)

(52) U.S. Cl.
CPC .......... *G06T 19/20* (2013.01); *G06K 9/00369* (2013.01); *G06K 9/4652* (2013.01);
(Continued)

(58) Field of Classification Search
None
See application file for complete search history.

(56) References Cited

U.S. PATENT DOCUMENTS 6,148,092 A * 11/2000 Qian ................. G06K 9/00234
382/118
2002/0059248 A1 5/2002 Farchione
(Continued)

FOREIGN PATENT DOCUMENTS

JP       9-106419 A      4/1997
JP    2000-315262 A     11/2000
(Continued)

OTHER PUBLICATIONS

Zhenglong Zhou, Bo Shu, Shaojie Zhuo, Xiaoming Deng, Ping Tan, and Stephen Lin. 2012. Image-based clothes animation for virtual fitting. In SIGGRAPH Asia 2012 Technical Briefs (SA '12). ACM, New York, NY, USA, Article 33, 4 pages. DOI: https://doi.org/10.1145/2407746.2407779.*

(Continued)

*Primary Examiner* — Kim Vu
*Assistant Examiner* — Nathan Bloom
(74) *Attorney, Agent, or Firm* — Sughrue Mion, PLLC (57) ABSTRACT

An object of the present invention is to provide a fitting support device and method which make it possible to reliably select apparel such as clothes that match user's appearance. The fitting support device includes: a color-characteristic processing unit 100 that acquires color characteristic data relating to user's skin color on the basis of captured image data; a body processing unit 101 that colors, on the basis of the color characteristic data, three-dimensional body shape data corresponding to body shape data on a user to thereby create body image data; a color-pattern processing unit 102 that acquires color pattern data corresponding to the color characteristic data, on the basis of (Continued)

clothing data; a wearing processing unit 103 that creates wearing image data on the basis of the body image data and the color pattern data; and a fitting processing unit 104 that creates fitting image data by synthesizing head portion image data on the user and the wearing image data.

8 Claims, 4 Drawing Sheets (51) Int. Cl.
| | | |
|---|---|---|
| *G06Q 30/06* | (2012.01) | |
| *G06T 7/50* | (2017.01) | |
| *G06K 9/00* | (2006.01) | |
| *G06K 9/46* | (2006.01) | |
| *G06T 19/00* | (2011.01) | |
| *G06T 7/73* | (2017.01) | |

(52) U.S. Cl.
CPC ......... *G06Q 30/06* (2013.01); *G06Q 30/0643* (2013.01); *G06T 7/50* (2017.01); *G06T 7/75* (2017.01); *G06T 7/90* (2017.01); *G06T 19/00* (2013.01); *G06T 2200/04* (2013.01); *G06T 2200/24* (2013.01); *G06T 2207/10016* (2013.01); *G06T 2207/10028* (2013.01); *G06T 2207/30196* (2013.01); *G06T 2210/16* (2013.01); *G06T 2219/2004* (2013.01)

(56) References Cited

U.S. PATENT DOCUMENTS

| | | | | |
|---|---|---|---|---|
| 2005/0264572 A1* | 12/2005 | Anast | ................. | G06F 17/5018 |
| | | | | 345/474 |
| 2013/0097194 A1* | 4/2013 | Braga | ............... | G06F 17/30256 |
| | | | | 707/758 |
| 2013/0113826 A1 | 5/2013 | Miyazaki | | |
| 2014/0336876 A1* | 11/2014 | Gieseke | ................. | G06F 3/005 |
| | | | | 701/36 |
| 2014/0347262 A1* | 11/2014 | Paek | ........................ | G09G 3/20 |
| | | | | 345/156 |

FOREIGN PATENT DOCUMENTS

| | | |
|---|---|---|
| JP | 2001-134745 A | 5/2001 |
| JP | 3314704 B2 | 8/2002 |
| JP | 2013-97699 A | 5/2013 |
| WO | 03/069526 A1 | 8/2003 |

OTHER PUBLICATIONS

S. Hauswiesner, M. Straka and G. Reitmayr, "Virtual Try-On through Image-Based Rendering," in IEEE Transactions on Visualization and Computer Graphics, vol. 19, No. 9, pp. 1552-1565, Sep. 2013. doi: 10.1109/TVCG.2013.67.*

Kalantidis, Yannis, Lyndon Kennedy, and Li-Jia Li. "Getting the look: clothing recognition and segmentation for automatic product suggestions in everyday photos." Proceedings of the 3rd ACM conference on International conference on multimedia retrieval. ACM, Apr. 2013.*

Saikia, Parimita, and Karen Das. "Head gesture recognition using optical flow based classification with reinforcement of GMM based background subtraction." arXiv preprint arXiv:1308.0890 (Mar. 2013).*

Cordier et al., "From 2D Photos of Yourself to Virtual Try-on Dress on the Web", People and Computers XV—Interaction without Frontiers, Joint Proceedings of HCI 2001 and IHM 2001, Sep. 10, 2001, pp. 31-46, XP008025524 (18 pages total).

Communication dated Mar. 22, 2017 issued by the European Patent Office in counterpart European Application No. 14854421.6.

International Search Report for PCT/JP2014/075786 dated Dec. 2, 2014 [PCT/ISA/210].

* cited by examiner

FITTING SUPPORT DEVICE AND METHOD

CROSS REFERENCE TO RELATED APPLICATIONS

This application is a National Stage of International Application No. PCT/JP2014/075786, filed on Sep. 29, 2014, which claims priority from Japanese Patent Application No. 2013-216301, filed on Oct. 17, 2013, the contents of all of which are incorporated herein by reference in their entirety.

TECHNICAL FIELD

The present invention relates to a fitting support device and method which virtually display a wearing state by combining, with image data on a user, three-dimensional image data obtained by synthesizing a three-dimensional body shape and image data on apparel such as clothes.

BACKGROUND ART

When purchasing apparel such as clothes to be worn at a shop or the like, it is common that a customer tries on a product to be purchased in advance in a fitting room or the like prepared in the shop and confirms the size or comfortableness of the clothes or whether or not the clothes fits his/her appearance.

In order for the customer to try on plural clothes to find the most preferable clothes from among the clothes the customer has tried on, it is necessary to make a comparison among the clothes in a state of trying on respective clothes. However, the customer has to make a comparison on the basis of customer's memory at the time of trying on the clothes. When the number of clothes to be tried on is large, the memory of the first fitting becomes vague, and the customer may incorrectly select his/her preferred clothes or may need to have another fitting, because of not being able to make sufficient comparison, which requires further time.

In order to deal with such a problem concerning fitting, a fitting support device that virtually displays a wearing state is proposed. For example, Patent Literature 1 describes a virtual fitting system that: reads clothing pattern-sheet information corresponding to clothes (clothes to be tried on) selected for trial fitting, and standard body information concerning a body shape of a standard body model; creates clothing image indicating clothes that fit the body shape of a person who tries on the clothes, on the basis of body shape information, fabric information, and sewing information; and creates a composite image (fitting image) on the basis of the created clothing image and a person image of the person who tries on the clothes. Furthermore, Patent Literature 2 describes: creating three-dimensional data obtained by causing data on a body portion prepared in advance to put on clothes made of a fabric selected by a customer; and performing display by combining the data with two-dimensional data on a captured head portion of the customer, whereby fitting simulation with a real feeling can be easily achieved. Moreover, Patent Literature 3 describes performing a fitting simulation by simultaneously displaying, on a display device, a model image in which clothes to be fitted are put on and a person image of a person who tries on the clothes; and by cutting a face image in the person image and moving the face image to a position of the model image to thereby perform the synthesis.

CITATION LIST

Patent Literature

PTL 1: Japanese Patent No. 3314704
PTL 2: Japanese Patent Laid-Open No. 2000-315262
PTL 3: Japanese Patent Laid-Open No. 2001-134745

SUMMARY OF INVENTION

Technical Problem

At the time of actually trying on clothes, it is ideal to select clothes that match user's appearance, and in particular, it is desirable to select clothes having a color shade that match user's skin color. In the case of Patent Literatures described above, a wearing state of being close to the actual fitting is displayed by combining the clothing image with a body shape of a body model to thereby synthesize the combined image and image data on the user. However, as to the clothes that match user's appearance, the user views the displayed image, and selects the clothes that match user's appearance. At this time, an examination is made mainly from the viewpoint of whether or not the design of the clothes matches the body shape of the user, and it is difficult for the user to make the examination from the viewpoint of whether or not the clothes have a color shade that matches user's skin color. Accordingly, it is difficult to select clothes that match user's appearance from various viewpoints.

Therefore, the present invention has an object to provide a fitting support device and method which make it possible to reliably select apparel such as clothes matching user's appearance.

Solution to Problem

A fitting support device according to the present invention includes: a capturing unit that captures an image of a user; a detection unit that detects a body shape of the user; an operation unit that performs a selection operation of clothes; a processing unit that creates fitting image data on clothing data selected by the operation unit, on the basis of captured image data obtained from the capturing unit and body shape data obtained from the detection unit; and a display unit that displays the created fitting image data, wherein the processing unit includes: a color-characteristic processing unit that acquires color characteristic data on user's skin color on the basis of the captured image data; a body processing unit that acquires three-dimensional body shape data on the basis of the body shape data and colors the three-dimensional body shape data on the basis of the color characteristic data to thereby create body image data; a color-pattern processing unit that acquires color pattern data corresponding to the color characteristic data on the basis of the clothing data; a wearing processing unit that creates wearing image data on the basis of the body image data and the color pattern data; and a fitting processing unit that acquires head portion image data on the user on the basis of the captured image data, and synthesizes the head portion image data and the wearing image data to thereby create the fitting image data. Furthermore, the detection unit is configured to detect user's posture, and the fitting processing unit creates the fitting image data on the basis of detected posture data. Moreover, the color-characteristic processing unit acquires the color characteristic data on the basis of hue, lightness, and saturation of a pixel concerning a skin portion in the captured image data. In addition, the fitting processing unit creates fitting image data by incorporating background image data captured by the capturing unit.

A fitting support method according to the present invention is a fitting support method of displaying fitting image data on clothing data selected by a user on the basis of captured image data and body shape data on the user, and the method includes the steps of: acquiring color characteristic data on user's skin color on the basis of the captured image data; acquiring three-dimensional body shape data on the basis of the body shape data, and coloring the three-dimensional body shape data on the basis of the color characteristic data to thereby create body image data; acquiring color pattern data corresponding to the color characteristic data on the basis of the clothing data; creating wearing image data on the basis of the body image data and the color pattern data; and acquiring head portion image data on the user on the basis of the captured image data, and synthesizing the head portion image data and the wearing image data to thereby create the fitting image data.

Advantageous Effects of Invention

The present invention has a configuration as described above and makes it possible to display a fitting image concerning clothes having a color pattern that matches user's skin color, and thus apparel such as clothes matching user's appearance can be efficiently selected.

DESCRIPTION OF EMBODIMENTS

Hereinafter, an embodiment according to the present invention will be described with reference to the drawings. Note that the embodiment described below is a preferred specific example for carrying out the present invention, and various technical limitations are imposed. However, the present invention is not limited to these embodiments unless it is specified in the following description that the present invention is limited.

Figure 1:
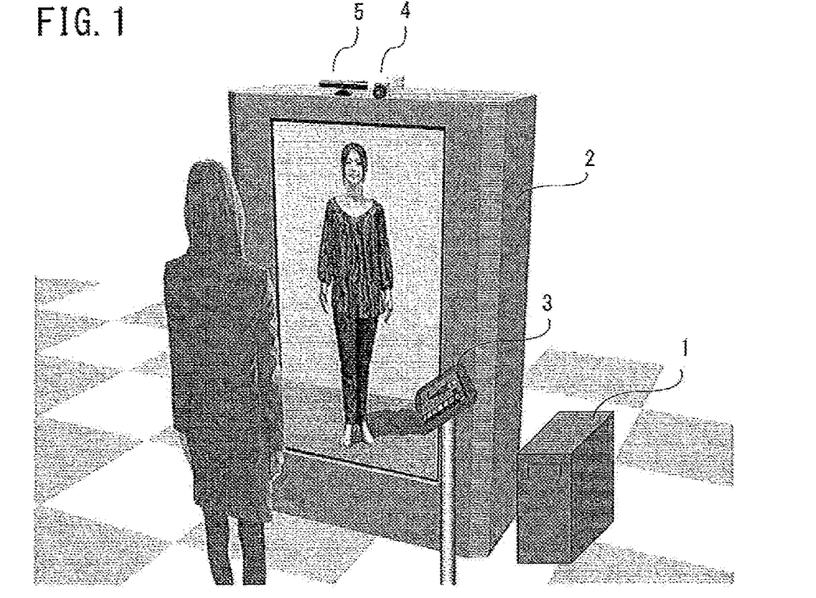
FIG. 1 is a schematic configuration view of a fitting support device according to the present invention.

FIG. 1 is a schematic configuration view of a fitting support device according to the present invention. The fitting support device includes an information processing device 1 that performs processing for displaying a fitting image, a display device 2 that displays the fitting image, an operation display device 3 a user operates to input data, a capturing device 4 that captures an image of a user, and a detection sensor 5 that detects a body shape of the user.

A well-known computer including a CPU, a memory, a hard disk, a transmission-reception unit, and the like can be used as the information processing device 1, and programs that achieve various functions for displaying the fitting image are installed in the information processing device 1. The display device 2 includes a large-sized display such as a liquid crystal display panel that can display a full-sized fitting image of a user, and is configured so that the user standing in front of the display device 2 can visibly recognize a fitting image with a feeling as if the user actually stands in front of a mirror. A well-known device such as a tablet terminal can be used as the operation display device 3 having an operation display function for performing operations necessary to display a fitting image. In addition, in the operation display device 3, image data for displaying an icon representing a color pattern or type of clothes is registered. A capturing camera capturing an image of a user standing in front of the display device 2 can be used as the capturing device 4 that is configured so that a color image of the user captured is transmitted to the information processing device 1. A depth sensor employing an infrared light or the like can be used as the detection sensor 5 having a function of detecting a body shape or posture of a user standing in front of the display device.

Figure 2:
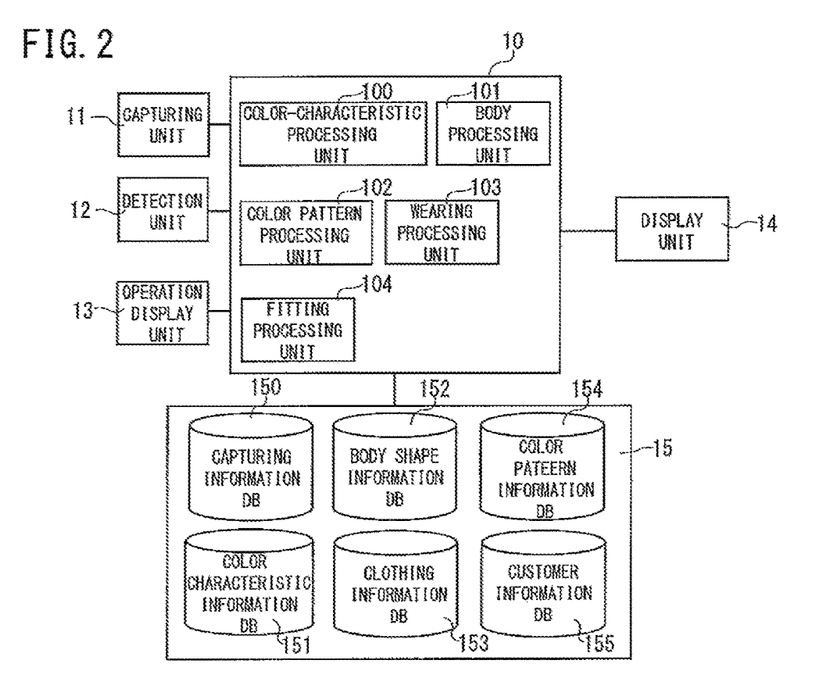
FIG. 2 is a functional block configuration diagram of the fitting support device.

FIG. 2 is a functional block configuration diagram of the fitting support device. A processing unit 10 controls the entire device, and includes a color-characteristic processing unit 100, a body processing unit 101, a color-pattern processing unit 102, a wearing processing unit 103, and a fitting processing unit 104, each of which serves as a function for displaying fitting images. A capturing unit 11 transmits a color image of a user captured by the capturing device 4 to the processing unit 10. A detection unit 12 transmits detected data obtained from the detection sensor 5 to the processing unit 10. An operation display unit 13 displays an image necessary for operation, and transmits an operational signal by the user, to the processing unit 10. In addition, the operation display unit 13 stores data necessary to select clothing and a color pattern transmitted from the processing unit 10, and displays the data. The display unit 14 displays a fitting image transmitted from the processing unit 10.

A memory unit 15 stores programs and data necessary for control processing and display processing of the device, and includes: a capturing information DB 150 that stores captured images of a user; a color characteristic information DB 151 that stores data necessary for analyzing the skin color of a body; a body shape information DB 152 that stores three-dimensional body shape data for displaying body shapes of bodies in a categorized manner; clothing information DB 153 that stores clothing data indicating three-dimensional data (for example, pattern-sheet data and the like) concerning various designs of apparel such as clothes; a color pattern information DB 154 that stores color pattern data on color patterns used in apparel such as clothes; and a customer information DB 155 that stores attribute information such as a body shape and a skin color of a user, or information concerning fitting conditions in the past.

The color-characteristic processing unit 100 acquires color characteristic data on user's skin color on the basis of the captured image data transmitted from the capturing unit 11. It is preferable to acquire data including, for example, hue, lightness, and saturation concerning a skin color, as the color characteristic data. The user's skin color can be classified into a warm color and a cool color on the basis of these data (reference: Masako Kadota, "Design method for personal color through measurement of skin color—No. 2: Method of selecting clothes—," Journal of the Color Science Association of Japan, May 1995, the Color Science Association of Japan). Fine Color Chart System Cross Cosmos 6000 (Japan Color Research Institute) is used for the classification method for the warm color or cool color described above, to analyze hue, lightness, and saturation. The warm-based skin color is a strong yellowy ocher-based color having a hue closer to yellow, and the cool-based skin color looks bluish pink having a hue of purplish red. The color-characteristic processing unit 100 acquires analysis data on the skin color such as the warm color or the cool color, as the color characteristic data.

The body processing unit 101 acquires three-dimensional body shape data from the body shape information DB 152 on the basis of body shape data on a user transmitted from the detection unit 12, and colors the three-dimensional body shape data on the basis of the color characteristic data obtained from the color-characteristic processing unit 100 to thereby create body image data. The skeleton of a user can be detected by using, for example, a depth sensor that performs irradiation with infrared light as the detection sensor, to thereby allow detection of the depth of an object. Then, three-dimensional body shape data corresponding to the skeleton of the user is read from the body shape information DB 152. In the body shape information DB 152, for example, three-dimensional body shape data created on the basis of size categories such as 9AR and 11AT specified in Japan Industrial Standards are registered, and a size category is determined on the basis of the size of a characteristic portion (for example, width of a shoulder and height) of the skeleton of a user, and then, three-dimensional body shape data close to the body shape of the user is acquired. Coloring processing is performed on the acquired three-dimensional body shape data on the basis of the color characteristic data to thereby create body image data.

The color-pattern processing unit 102 acquires, from the color pattern information DB 154, color pattern data corresponding to the color characteristic data obtained from the color-characteristic processing unit 100 on the basis of clothing data selected by the user in the operation display unit 13. For example, in the case where the skin color is set to a warm color or cool color as the color characteristic data, the following color shade is selected for the color pattern data corresponding to the skin color.

<In the Case of Female>
 Warm-based: ivory, camel, red, brown, khaki
 Cool-based: gray, charcoal gray, black, white, navy, wine red
<In the Case of Male>
 Warm-based: camel, dark brown, olive green
 Cool-based: gray, charcoal gray, navy In addition, the color pattern data acquired by the color-pattern processing unit 102 is transmitted to the operation display unit 13, and is displayed. The user selects a favorite color pattern from the color pattern data displayed on the operation display unit 13. In this case, color patterns with color shades that match user's skin color are selected in advance, and are displayed on the operation display unit 13, and thereby the user can choose a color pattern from the color patterns that match his/her skin color. As to the color pattern data displayed on the operation display unit 13, it is possible to enhance convenience when the user selects the color pattern data, by preferentially displaying the data matching the skin color.

The wearing processing unit 103 reads, from the clothes information DB 153, three-dimensional data on the clothing data selected by the user in the operation display unit 13, and performs image processing so that the body image data obtained from the body processing unit 101 is made to virtually put on the three-dimensional data on the clothing data. For example, the processing is performed on shape change such as drooping and pleats in accordance with mechanical properties of cloth of the clothing data. The three-dimensional data on the clothing data is selected so as to match the size category of a user used at the time when the body image data is created. Then, on the basis of color pattern data selected in the operation display unit 13, coloring processing is performed on the three-dimensional data, on which the body image data is made to put, and the colored clothing data is overlapped with the colored body image data to thereby create wearing image data. Since the wearing image data is obtained by overlapping the body image data and the clothing data in accordance with the size category of a user, it is possible to obtain the wearing image data in which the body image data does not protrude from the clothing data. In addition, the wearing image data is created as three-dimensional image data, and thus it becomes possible to obtain wearing image data viewed not only from the front side of the user but also from various directions including the front and rear, and left and right directions.

The fitting processing unit 104 acquires head portion image data on a user on the basis of captured image data obtained from the capturing unit 11, and synthesizes the head portion image data and the wearing image data obtained from the wearing processing unit 103 to thereby create fitting image data. When the head portion image data on a user is acquired, the image region of a portion above the neck of a user is defined on the basis of data on the position and the posture of the user detected by the detection unit 12, and the head portion image data is cut out from the captured image data to thereby obtain the head portion image data. Then, the wearing image data is synthesized while being aligned with the acquired head portion image data, thereby creating fitting image data. In this case, it is also possible to align the head portion image data with the wearing image data and thereby create the fitting image data.

The fitting image is displayed on the display unit 14 in response to the position and the posture of the user. Thus, in the case where the user moves or rotates, the movement state or rotating state is detected by the detection unit 12 in real time, and is reflected to the fitting image data. As to the user's posture, for example, skeleton data is created on the basis of a detected signal of the user from the detection unit 12, and the user's posture can be recognized on the basis of shape change of the skeleton data. Then, head portion image data is extracted from the captured image data in real time, and fitting image is created by performing synthesis so that the wearing image data follows the head portion image data that moves in response to the user, with the result that the user can visually recognize the fitting image without a feeling of unnaturalness. By displaying the fitting image as described above, clothes the user wears are deleted, and only the head portion image is synthesized with the wearing image that matches the body shape or skin color of the user, and thus it becomes possible to display the fitting image in a state of being close to an actual state.

Furthermore, the fitting state can be checked with a real feeling as if the user views a mirror, by capturing a background image in advance as a still image, and combining the background image with a fitting image. In the case where a background image is partially contained in the head portion image of a user, a fitting image is created by aligning the head portion image so as to match the background image and by aligning the wearing image with the head portion image, and thus a real feeling of the fitting state can be enhanced.

The fitting image is displayed as a three-dimensional image, and thus, also in the case where a user wishes to confirm the fitting sideways or backwards, the fitting image changes in response to the position and the posture of the user, and can be visually recognized as if the user views a mirror. In addition, in the case of a backward posture that can be difficult to be visually recognized, it is possible to confirm the fitting state by performing an operation of storing, in a backward state, a still image in the operation display unit 13 and then viewing the still image after the operation.

As described above, the user can confirm apparel such as clothes that match user's skin color or style and also confirm the color shade of the apparel while visually recognizing image data that is close to the actual fitting state, and thus the user can efficiently select apparel such as clothes that match user's appearance. In addition, body shape data on a user, selected clothing data, and color pattern data are stored in the customer information DB 155, and are utilized as history information when the user uses the fitting support device thereafter.

Figure 3:
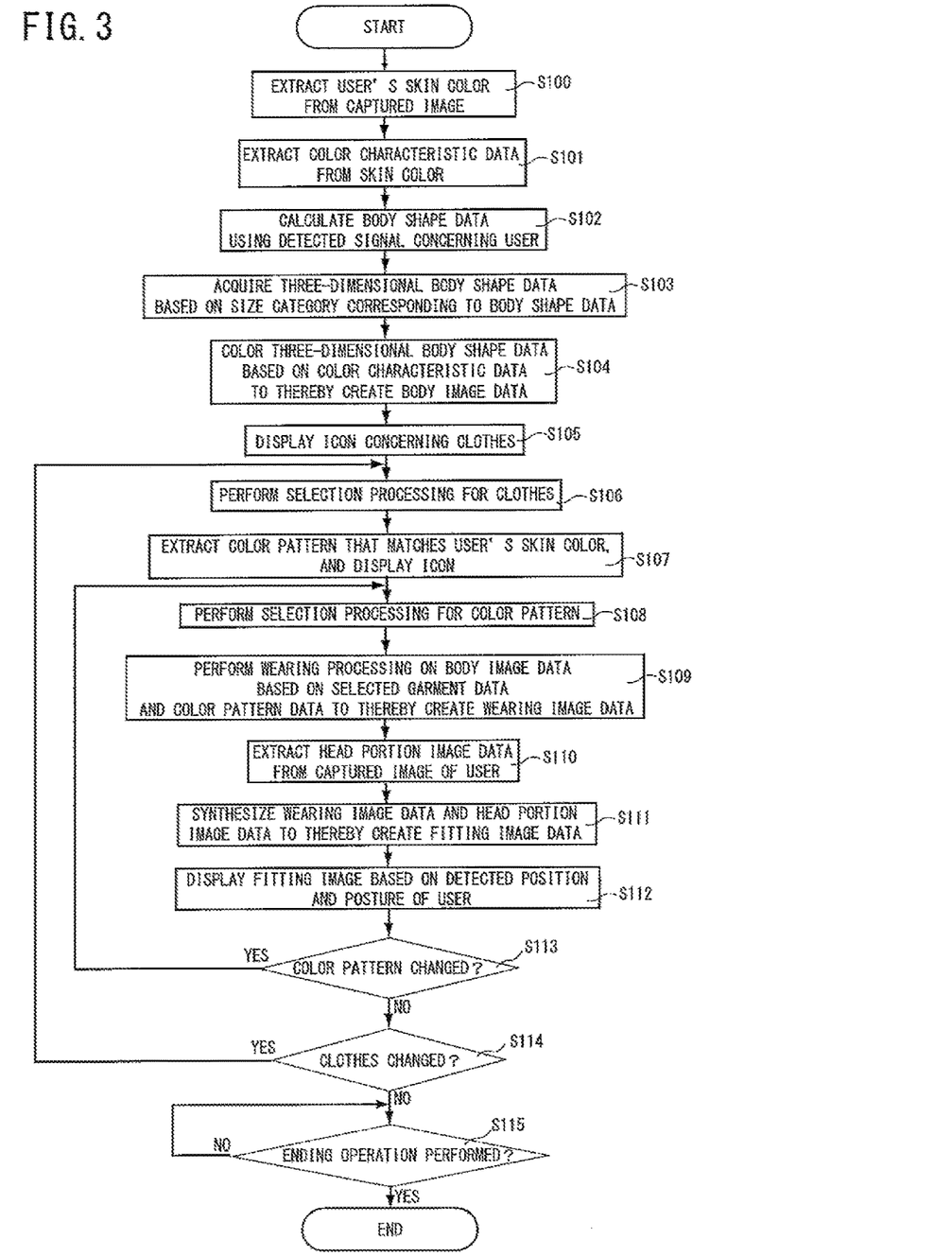
FIG. 3 is a flowchart of fitting support processing.

FIG. 3 is a flowchart of fitting support processing. First, the user stands in front of the display device 2 of the fitting support device illustrated in FIG. 1, and stands in an upright position in a state of putting its feet at predetermined positions and of facing the display device 2. In this state, the capturing device 4 captures an image of the user, and the detection sensor 5 detects the body shape of the user. In the case where a background image is incorporated into a fitting image, the background image is captured as a still image by using the capturing device 4 before the image of the user is captured.

Then, extraction processing of the skin color is performed from the captured image data on the user (S100), and the data on the skin color extracted is analyzed to thereby give color characteristic data (S101). As to the skin color, it is preferable to extract colors from a portion below ears or from cheeks of the user where user's ground color is exhibited. The position of extraction can be identified by image recognition of portions such as eyes, a nose, or a mouth on the basis of the captured image of the face of the user.

Figure 4:
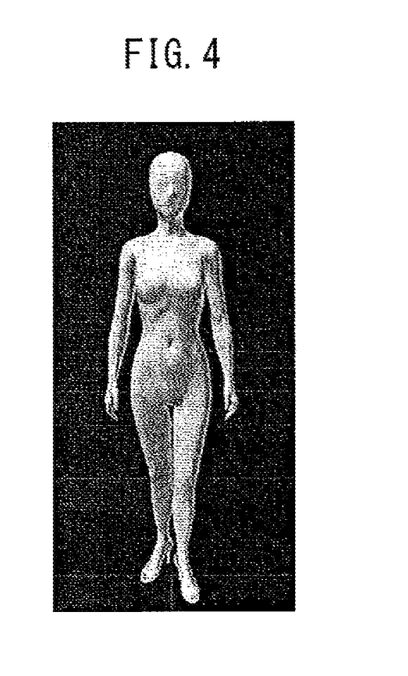
FIG. 4 is an explanatory view illustrating a three-dimensional body shape.
Figure 5:
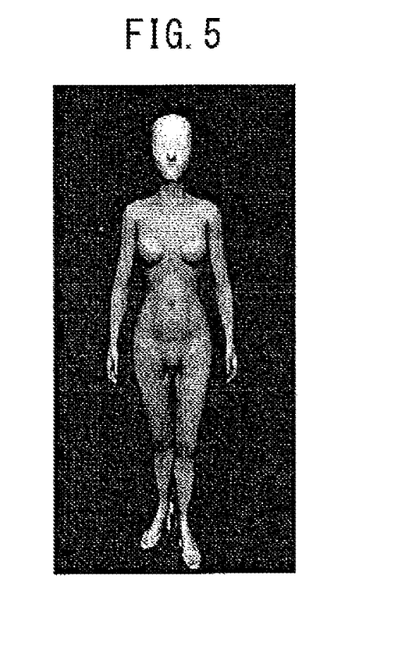
FIG. 5 is an explanatory view illustrating a body image.

Body shape data such as the width of a shoulder and the height are calculated on the basis of the detected signals from the detection sensor 5 (S102), and three-dimensional body shape data on the size category close to the body shape of a user is acquired on the basis of the calculated body shape data (S103). FIG. 4 is an explanatory view illustrating the acquired three-dimensional body shape data. There is displayed three-dimensional body shape data on an average body shape corresponding to the size category. Then, coloring processing corresponding to the color characteristic data is performed on the acquired three-dimensional body shape data to thereby create body image data as illustrated in FIG. 5 (S104). The created body image data represents an image having a body shape and a skin color close to those of the user, and thus the user can confirm whether or not clothes fit user's appearance at the time of trying on the clothes.

Figure 6:
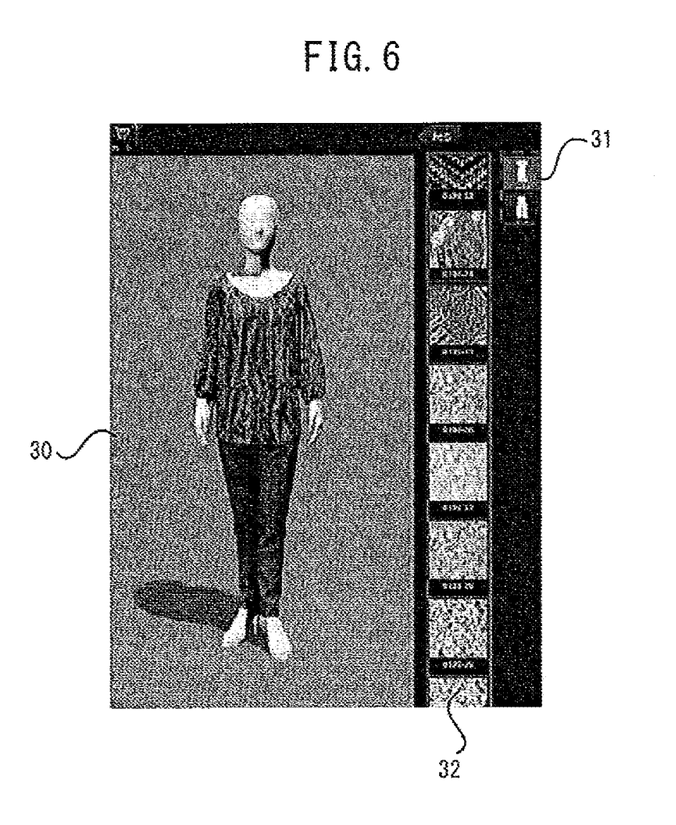
FIG. 6 is an explanatory view illustrating one example of a display screen of an operation display device.

Then, icon display concerning clothing designs is performed on the operation display device 3 (S105), and the user selects a displayed icon, whereby selection processing for clothing design is performed (S106). Furthermore, in relation to the clothing design subjected to selection processing, color pattern data that matches user's skin color is extracted on the basis of the color characteristic data, and is displayed on the operation display device 3 as an icon (S107). FIG. 6 illustrates an example of the display screen of the operation display device 3. There are set, on the display screen, a display area 30 for a fitting image, which will be described later, a display area 31 in which icons for clothing designs are displayed, and a display area 32 in which icons for color patterns are displayed. In the display area 32, a color pattern that matches user's skin color is preferentially displayed. In addition, the user performs a selection operation of his/her favorite color pattern, by performing a scroll operation of the display area 32 to thereby display color patterns.

The user selects a color pattern displayed as an icon on the operation display device 3, and thus selection processing for a color pattern is performed (S108). Then, on the basis of the selected color pattern and the selected clothing design, the body image data is made to put on three-dimensional data on the clothing design, and coloring processing is performed depending on the color pattern to thereby create wearing image data (S109). After that, head portion image data on the user is subjected to extraction processing from the captured image data captured by the capturing device 4 (S110), and the wearing image data is synthesized while being aligned with the head portion image data on the user, thereby creating fitting image data (S111). In the case where background image data is incorporated, the head portion image data is positioned on the background image data, and subsequently, the wearing image data is synthesized while being aligned with the head portion image data, thereby creating the fitting image data.

The fitting image is displayed on the display device 2 on the basis of the position and the posture of the user detected by the detection sensor 5 (S112). The position and the posture of the user are detected in real time, and the fitting image is displayed according to the position and the posture of the user, and thus the user can visually recognize the fitting state as if the user views a mirror. It becomes possible to display a fitting state without a feeling of naturalness by extracting the head portion image data from the captured image data on a user in real time; by positioning the wearing image data according to movement of the head portion image data; and by creating the fitting image data. In addition, it is also possible to store horizontal and backward fitting images and check them by later display, and thus it becomes possible to closely examine whether or not the selected clothing design and color pattern match user's appearance.

After the fitting state is confirmed by the user, it is checked whether or not another color pattern is selected (S113), and when selection operation is performed, the color pattern is assumed to be changed, and the procedure returns to step S108 and selection processing for a color pattern is performed. Then, wearing image data is created on the basis of the selected color pattern. When no other color pattern is selected, it is checked whether or not another clothing design is selected (S114), and when another clothing design is selected, the clothing design is assumed to be changed, and the procedure returns to step S106 and selection processing for clothing design is performed. In addition, selection processing for a color pattern and creation processing for wearing image data are performed on the basis of another clothing design. When neither color pattern nor clothing design is selected, it is checked whether or not ending operation is performed (S115), and when ending operation is performed, ending processing is performed.

In the example described above, description has been made of an example in which apparel such as clothes is used as clothing data. However, the present invention can be used as a costume-wearing support device that stores, as clothing data, costumes of characters from animation, TV drama, or the like, as clothing data to display an image in which these costumes are virtually put on.

REFERENCE SIGNS LIST 1 information processing device
2 display device 3 operation display device
4 capturing device
5 detection sensor

The invention claimed is:

1. A computer-based fitting support device, comprising:
a capturing unit that captures a moving image of a user in real time, including head portion image data, and creates captured image data;
a detection unit that detects a body shape of the user and creates body shape data;
an operation unit that performs a selection operation of clothes;
a processing unit that creates fitting image data on clothing data selected by the operation unit, on the basis of captured image data obtained from the capturing unit and body shape data obtained from the detection unit; and
a display unit that displays the created fitting image data, wherein the processing unit includes:
  a color-characteristic processing unit that acquires color characteristic data on user's skin color on the basis of the head portion image data in the captured image data;
  a body processing unit that acquires three-dimensional body shape data on the basis of the body shape data and colors the three-dimensional body shape data on the basis of the color characteristic data to thereby create body image data;
  a color-pattern processing unit that acquires color pattern data corresponding to the color characteristic data on the basis of the clothing data;
  a wearing processing unit that creates wearing image data on the basis of the body image data and the color pattern data; and
  a fitting processing unit that extracts the head portion image data of the user from the captured image data, and synthesizes the head portion image data and the wearing image data,
wherein the detection unit is configured to detect a user's posture in real time and create posture data, and
wherein the fitting processing unit creates the fitting image data in real time on the basis of the real-time detected posture data and the real-time detected head portion image data synthesized with the wearing image data by positioning the wearing image data according to movement of the head portion image data.

2. The fitting support device according to claim 1, wherein the color-characteristic processing unit acquires the color characteristic data on the basis of hue, lightness, and saturation of a pixel concerning a skin portion in the captured image data.

3. The fitting support device according to claim 1, wherein the fitting processing unit creates fitting image data by incorporating background image data captured by the capturing unit.

4. A computer-based fitting support method of displaying on a display fitting image data on clothing data selected by a user on the basis of captured image data comprising a moving image of a user in real time, including head portion image data, and body shape data of the user, the method comprising the steps of:
acquiring color characteristic data of the user's skin color on the basis of the head portion image data in the captured image data;
acquiring three-dimensional body shape data on the basis of the body shape data, and coloring the three-dimensional body shape data on the basis of the color characteristic data to thereby create body image data and reflecting the fitting image data in real time;
acquiring color pattern data corresponding to the color characteristic data on the basis of the clothing data;
creating wearing image data on the basis of the body image data and the color pattern data;
extracting head portion image data of the user from the captured image data in real time, and synthesizing the head portion image data and the wearing image data,
detecting a user's posture in real time and creating posture data, and
creating fitting image data in real time on the basis of the real-time detected posture data and the real-time detected head portion image data synthesized with the wearing image data by positioning the wearing image data according to movement of the head portion image data,
wherein the wearing image data follows the head portion image data that changes in response to the user's movement.

5. The fitting support device according to claim 1, wherein the detection unit comprises a depth sensor to detect a body shape and posture, determine a skeleton of the user, and create skeleton data reflecting the body shape and posture.

6. The fitting support device according to claim 5, wherein the depth sensor is an infrared light sensor.

7. The computer-based fitting support method according to claim 4, wherein
the detection unit comprises a depth sensor to detect a body shape and posture, determine a skeleton of the user, and create skeleton data reflecting the body shape and posture.

8. The computer-based fitting support method according to claim 7, wherein
the depth sensor is an infrared light sensor.

* * * * *